(12) United States Patent
Mikhemar et al.

(10) Patent No.: US 8,457,580 B2
(45) Date of Patent: Jun. 4, 2013

(54) COMPACT LOW-POWER RECEIVER ARCHITECTURE AND RELATED METHOD

(75) Inventors: Mohyee Mikhemar, Irvine, CA (US); Hooman Darabi, Laguna Niguel, CA (US); Masoud Kahrizi, Irvine, CA (US)

(73) Assignee: Broadcom Corporation, Irvine, CA (US)

( * ) Notice: Subject to any disclaimer, the term of this patent is extended or adjusted under 35 U.S.C. 154(b) by 336 days.

(21) Appl. No.: 12/804,399

(22) Filed: Jul. 20, 2010

(65) Prior Publication Data

US 2012/0021699 A1 Jan. 26, 2012

(51) Int. Cl.
*H04B 7/00* (2006.01)
*H04B 1/40* (2006.01)

(52) U.S. Cl.
USPC .......................................... 455/234.1; 455/75

(58) Field of Classification Search
USPC .................. 455/130, 136, 138, 232.1, 234.1, 455/241.1, 75
See application file for complete search history.

(56) References Cited

U.S. PATENT DOCUMENTS

| | | | | |
|---|---|---|---|---|
| 6,999,745 | B2* | 2/2006 | Leenaerts | 455/313 |
| 7,257,383 | B2* | 8/2007 | Young et al. | 455/138 |
| 7,519,348 | B2* | 4/2009 | Shah | 455/285 |
| 7,865,164 | B2* | 1/2011 | Xu et al. | 455/323 |

* cited by examiner

*Primary Examiner* — Sonny Trinh
(74) *Attorney, Agent, or Firm* — Farjami & Farjami LLP (57) ABSTRACT

According to one embodiment, a compact low-power receiver comprises a front-end producing a front-end gain and a back-end producing a back-end gain. The front-end includes a transconductance amplifier providing digital gain control and outputting an amplified receive signal, a mixer for generating a down-converted signal from the amplified receive signal, and a transimpedance amplifier (TIA) including a current mode buffer. The TIA provides gain control for amplifying the down-converted signal to produce a front-end output signal. In one embodiment, the back end includes a second-order low-pass filter to produce a filtered signal from the front-end output signal and an analog-to-digital converter (ADC), wherein the filtered signal is fed directly to the ADC without direct-current (DC) offset cancellation being performed. In various embodiments, the front-end gain is substantially greater than the back-end gain.

20 Claims, 5 Drawing Sheets

COMPACT LOW-POWER RECEIVER ARCHITECTURE AND RELATED METHOD

BACKGROUND OF THE INVENTION

1. Field of the Invention

The present invention is generally in the field of electronic circuits and systems. More specifically, the present invention is in the field of communications circuits and systems.

2. Background Art

Transceivers are typically used in communications systems to support transmission and reception of communications signals through a common antenna, for example, at radio frequency (RF) in a cellular telephone or other mobile communications to device. A conventional receiver typically utilizes several stages to amplify and process what may often be a weak reception signal. In the receiver "front-end," for example, a low noise amplifier (LNA) may be used to boost the reception signal prior to down-conversion from RF to baseband by a mixer stage. In a conventional receiver "back-end," the baseband signal is then filtered by a high-order low-pass filter (LPF), for example a $4^{th}$-order or $5^{th}$-order LPF, which provides substantial additional gain control in the conventional receiver design.

In such a conventional receiver, for example, the gain control provided by the receiver as a whole may be primarily produced by the receiver back-end, with the high-order LPF contributing a significant portion of the overall gain. Due to the stringent requirements imposed on the high-order LPF in conventional receiver designs, however, the high-order LPF typically consumes much of the power and dominates most of the area required to implement the receiver. In addition to the LPF discussed as an example above, other blocks in the conventional receiver architecture can also contribute to undesirable power and area consumption. As communications technologies move toward ever smaller device sizes and adopt ever lower power consumption constraints, as represented by the 40 nm technology node, for example, the relative bulk and high power consumption of conventional receiver architectures have become increasingly undesirable.

Thus, there is a need to overcome the drawbacks and deficiencies in the art by providing a compact low-power receiver architecture suitable for implementation as part of a mobile device transceiver.

SUMMARY OF THE INVENTION

The present invention is directed to a compact low-power receiver architecture and related method, substantially as shown in and/or described in connection with at least one of the figures, and as set forth more completely in the claims.

DETAILED DESCRIPTION OF THE INVENTION

The present invention is directed to a compact low-power receiver architecture and related method. Although the invention is described with respect to specific embodiments, the principles of the invention, as defined by the claims appended herein, can obviously be applied beyond the specifically described embodiments of the invention described herein. Moreover, in the description of the present invention, certain details have been left out in order to not obscure the inventive aspects of the invention. The details left out are within the knowledge of a person of ordinary skill in the art.

The drawings in the present application and their accompanying detailed description are directed to merely exemplary embodiments of the invention. To maintain brevity, other embodiments of the invention, which use the principles of the present invention are not specifically described in the present application and are not specifically illustrated by the present drawings.

Figure 1:
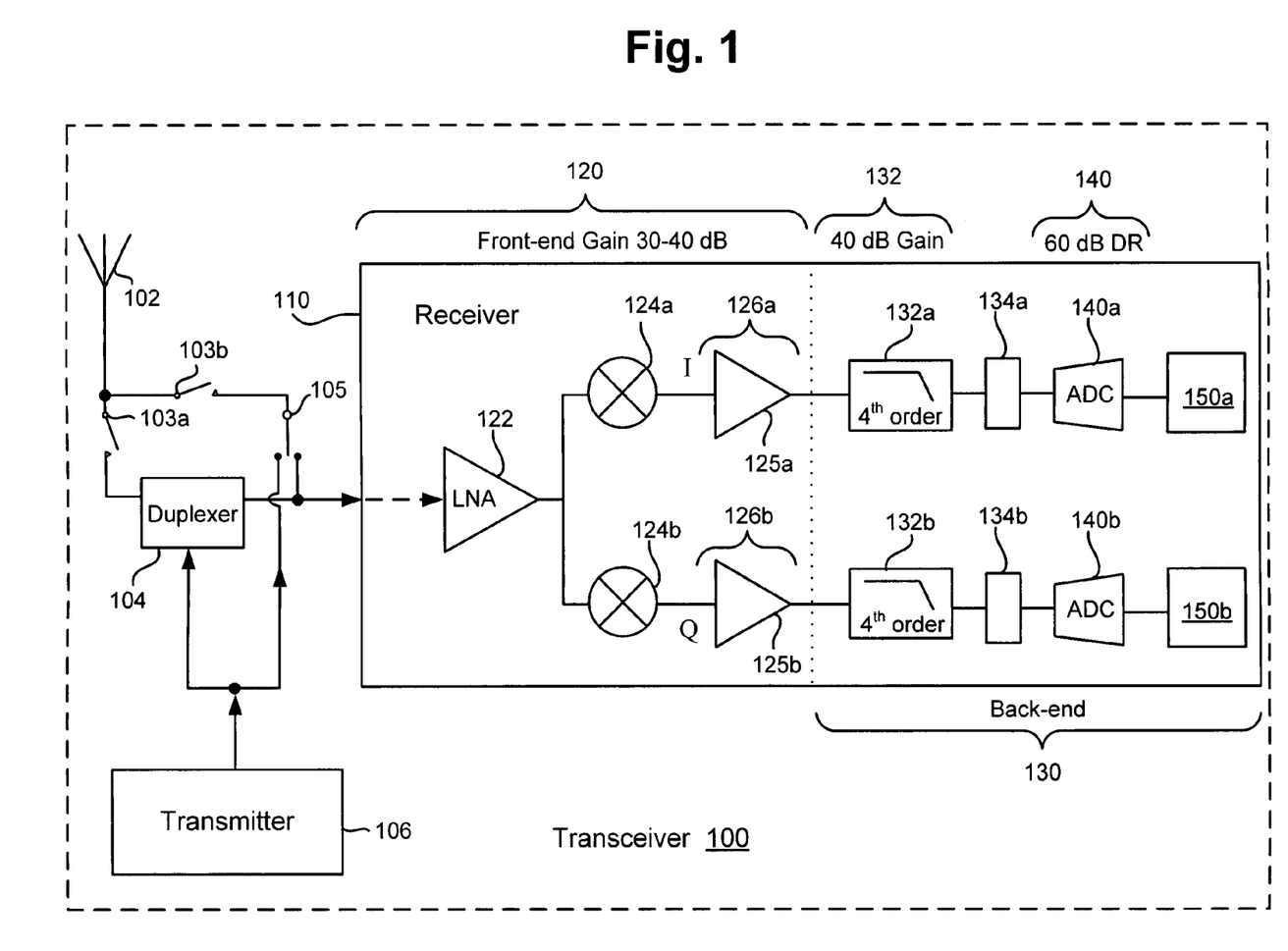
FIG. 1 is a conceptual block diagram of a conventional receiver included in a transceiver.

FIG. 1 is a conceptual block diagram of a conventional receiver implementation in transceiver 100. Transceiver 100 comprises antenna 102, transceiver input/output routing switches 103a and 103b, duplexer 104, transmit/receive (T/R) switch 105, transmitter 106, and conventional receiver 110 including receiver front-end 120 and receiver back-end 130. As shown in FIG. 1, receiver front-end 120 includes low noise amplifier (LNA) 122, mixers 124a and 124b working in conjunction with, respectively, in-phase (I) and quadrature-phase (Q) signals provided by a local oscillator (local oscillator not shown in FIG. 1), and transimpedance amplifiers (TIAs) 126a and 126b including respective buffer circuits 125a and 125b. As also shown in FIG. 1, receiver back-end 130 includes fourth-order low-pass filters ($4^{th}$-order LPFs) 132a and 132b, direct-current (DC) offset cancellation circuits 134a and 134b, analog-to-digital converters (ADCs) 140a and 140b, and digital processors 150a and 150b, to perform back-end processing of the respective I and Q signal components. In the conventional implementation shown in FIG. 1, ADCs 140a and 140b comprise ADC stage 140 providing approximately 60 dB of dynamic range.

As indicated in FIG. 1, in a conventional approach to implementing a receiver in a communications transceiver, such as receiver 110 implemented as part of transceiver 100, the gain provided by the receiver back-end typically at least equals, and may often exceed, the front-end gain. According to the conventional implementation represented in FIG. 1, for example, receiver front-end 120 contributes about 30-40 dB of the overall receiver gain, while another 40 dB of gain is provided as $4^{th}$-order LPF gain by LPF gain stage 132 of receiver back-end 130.

Reliance on the back-end gain provided by conventional receiver 110 comes at a considerable price in terms of power and circuit area consumption, however. For example, the stringent noise requirement typically imposed on $4^{th}$-order LPFs 132a and 132b results in those features consuming much of the power and dominating most of the area required to implement conventional receiver 110. In addition, because a high-order LPF, such as $4^{th}$-order LPFs 132a and 132b, or even $5^{th}$-order LPFs in some implementations, are utilized in conventional receiver 110 to provide the high level of back-end gain, DC offset cancellation circuits 134a and 134b are required to interface the high-order LPFs with respective ADCs 140a and 140b, adding additional power consumption and circuit area burdens. As communications technologies continue to move in the direction of smaller device dimensions and smaller power supplies, as represented, for example, by the 40 nm technology node, the relative bulk and large power demands of conventional receiver 110 represent significant implementational disadvantages.

Figure 2:
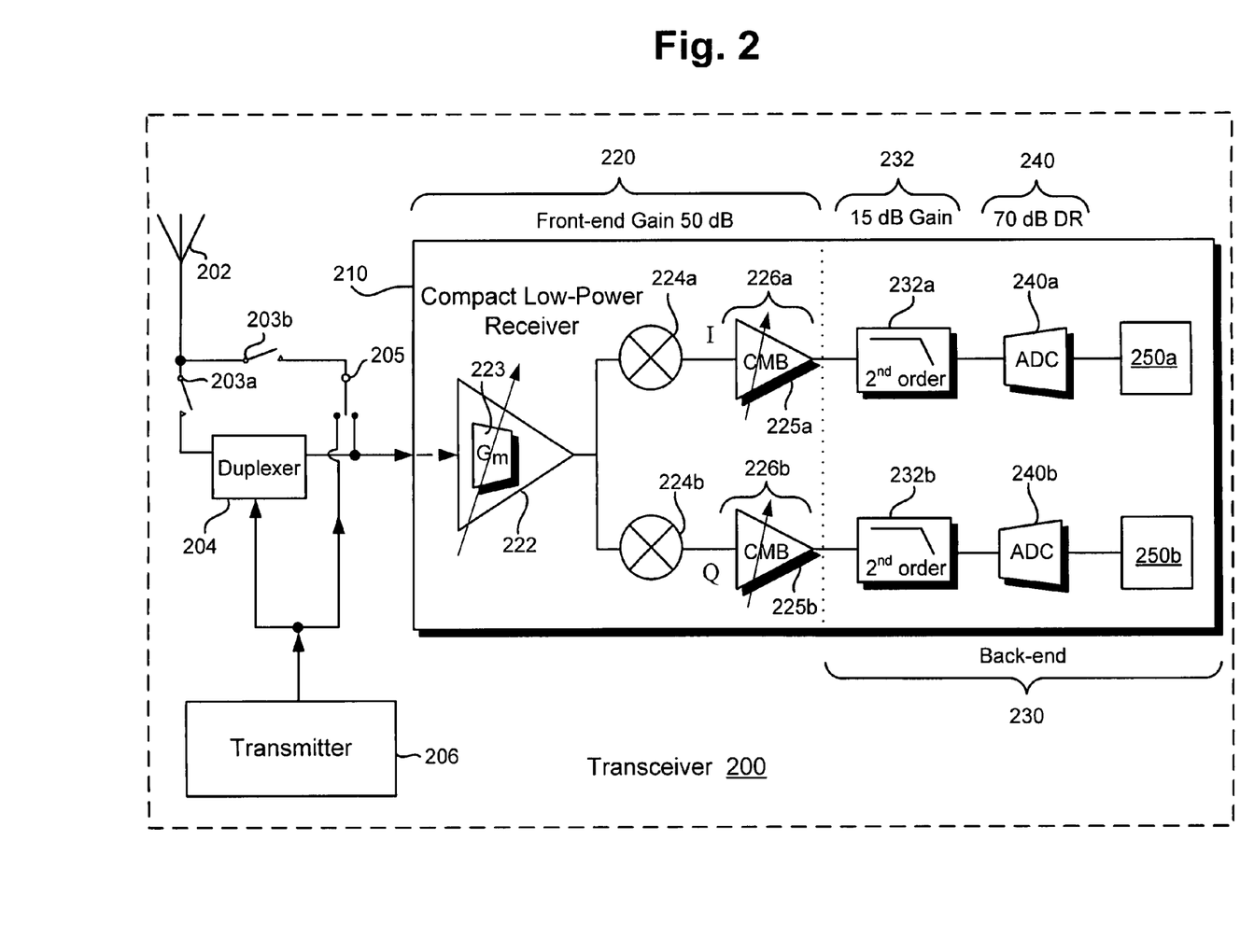
FIG. 2 is a conceptual block diagram of a compact low-power receiver included in a transceiver, according to one embodiment of the present invention.

Turning to FIG. 2, FIG. 2 shows a conceptual block diagram of transceiver 200 including a compact low-power receiver, according to one embodiment of the present invention, capable of overcoming the disadvantages associated with the conventional design described above in relation to FIG. 1. It is noted that the arrangement shown in FIG. 2 is for the purpose of providing an overview, and elements shown in that figure are conceptual representation of physical and electrical elements, and are thus not intended to show dimensions or relative sizes or scale.

Transceiver 200 comprises antenna 202, transceiver input/output routing switches 203a and 203b, duplexer 204, transmit/receive (T/R) switch 205, transmitter 206, and compact low-power receiver 210 including receiver front-end 220 and receiver back-end 230. As shown in FIG. 2, receiver front-end 220 includes LNA 222 including adjustable transconductance amplifier 223 configured to provide digital gain control, mixers 224a and 224b working in conjunction with, respectively, I and Q signals provided by a local oscillator (local oscillator not shown in FIG. 2), and TIAs 226a and 226b including respective current mode buffers 225a and 225b. As also shown in FIG. 2, receiver back-end 230 includes second-order low-pass filters ($2^{nd}$-order LPFs) 232a and 232b, ADCs 240a and 240b, and digital processors 250a and 250b, to perform back-end processing of the respective I and Q signal components.

According to the embodiment of FIG. 2, ADCs 240a and 240b can comprise high dynamic range ADCs and form ADC stage 240 providing approximately 70 dB of dynamic range, for example. Notable by its omission from compact low-power receiver 210 is circuitry for providing DC offset cancellation between $2^{nd}$-order LPFs 232a and 232b, and respective ADCs 240a and 240b. Transceiver 200, in FIG. 2, may be utilized in a cellular telephone or other mobile device communicating at radio frequency (RF), for example, such as in a frequency range from approximately 0.8 GHz to approximately 2.2 GHz.

In marked contrast to the conventional receiver implementation shown in FIG. 1, the embodiment of the present invention shown in FIG. 2 produces a substantial majority of the overall gain provided by compact low-power receiver 210 in the form of front-end gain. As indicated in FIG. 2, for example, receiver front-end 220 contributes 50 dB of the overall receiver gain, while receiver back-end LPF stage 232 comprising $2^{nd}$-order LPFs 232a and 232b is relied upon for a substantially smaller gain contribution, e.g., approximately 15 dB of gain. Consequently, the front-end gain produced by compact low-power receiver 210 may be approximately two times greater than the back-end gain produced by compact low-power receiver 210, or even more.

As described above in relation to FIG. 1, reliance on the higher back-end gain provided by conventional receiver implementations comes at a considerable price in terms of power consumption and circuit area usage. By eliminating that conventional reliance on back-end gain, embodiments of the present invention are able to implement a receiver that is both compact, e.g., requires less circuit area for implementation, and consumes less power than conventional designs. Thus, in one embodiment, compact low-power receiver 210 can be an integrated circuit (IC) fabricated on a single semiconductor die using a 40 nm process technology, for example.

By utilizing LNA 222 including adjustable transconductance amplifier 223 to provide digital gain control prior to down-conversion of a receive signal, and TIAs 226a and 226b including respective current mode buffers 224a and 225b to provide additional gain control to amplify the down-converted signals, the embodiment of FIG. 2 boosts the front-end gain of compact low-power receiver 210 compared to that of conventional receiver 110, in FIG. 1. The increase in front-end gain provided by compact low-power receiver 210 reduces the reliance on back-end gain in embodiments of the present invention. That outcome, in turn, relaxes the noise requirement on the LPFs used for filtering in receiver back-end 230. Consequently, $2^{nd}$-order LPFs 232a and 232b can be implemented in receiver back-end 230, in place of the $4^{th}$-order or $5^{th}$-order LPFs required by conventional designs. Moreover, that substitution can be made without sacrificing receiver performance, thereby reducing the area requirements and power requirements flowing from use of high-order LPF in conventional designs without imposition of a significant performance cost.

In addition, use of $2^{nd}$-order LPFs 232a and 232b in place of conventional high-order LPFs enables omission of circuitry providing DC offset cancellation between $2^{nd}$-order LPFs 232a and 232b and respective ADCs 240a and 240b. That omission adds still more to the overall savings in both circuit area and power consumption achievable through implementation of compact low-power receiver 210, while also reducing the complexity of receiver back-end 230 compared to conventional designs. Consequently, the compact low-power receiver architecture disclosed herein is particularly well suited to meet fine dimensional and low power supply constraints as fabrication technologies transition to the 40 nm node and beyond.

Figure 3:
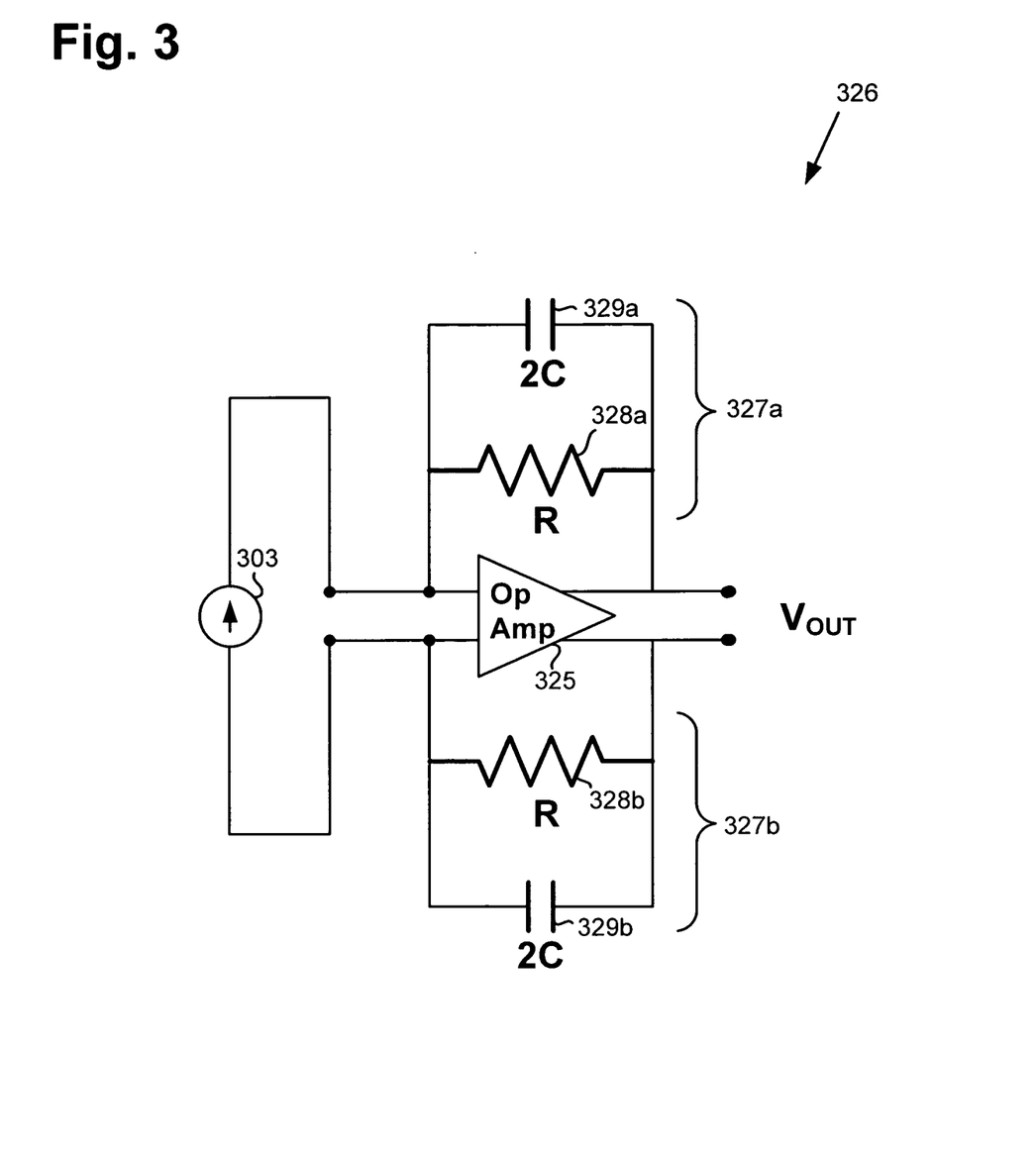
FIG. 3 shows an op-amp based transimpedance amplifier typically utilized in a conventional receiver.
Figure 4:
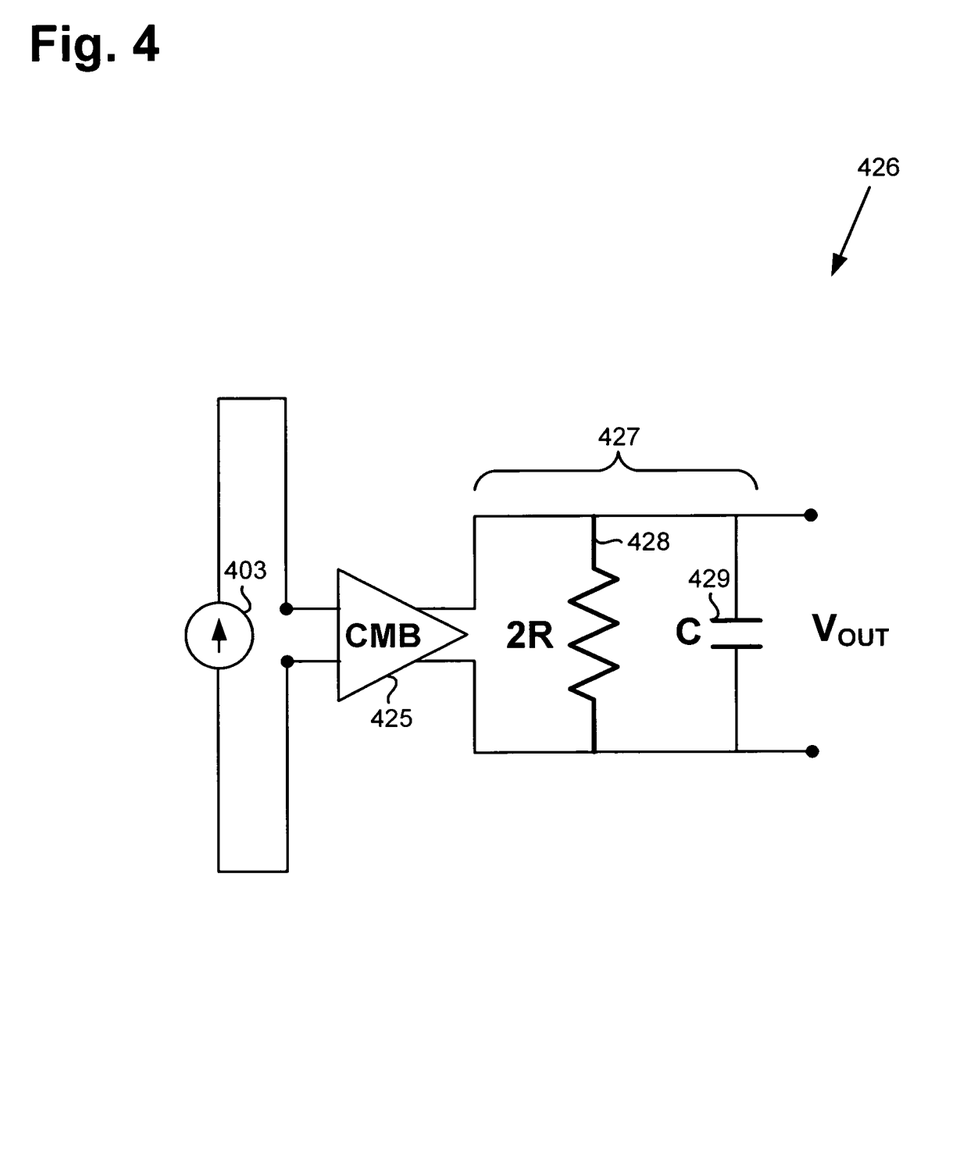
FIG. 4 illustrates a current mode buffer based transimpedance amplifier providing gain control and suitable for implementation in a compact low-power receiver, according to one embodiment of the present invention.
Figure 5:
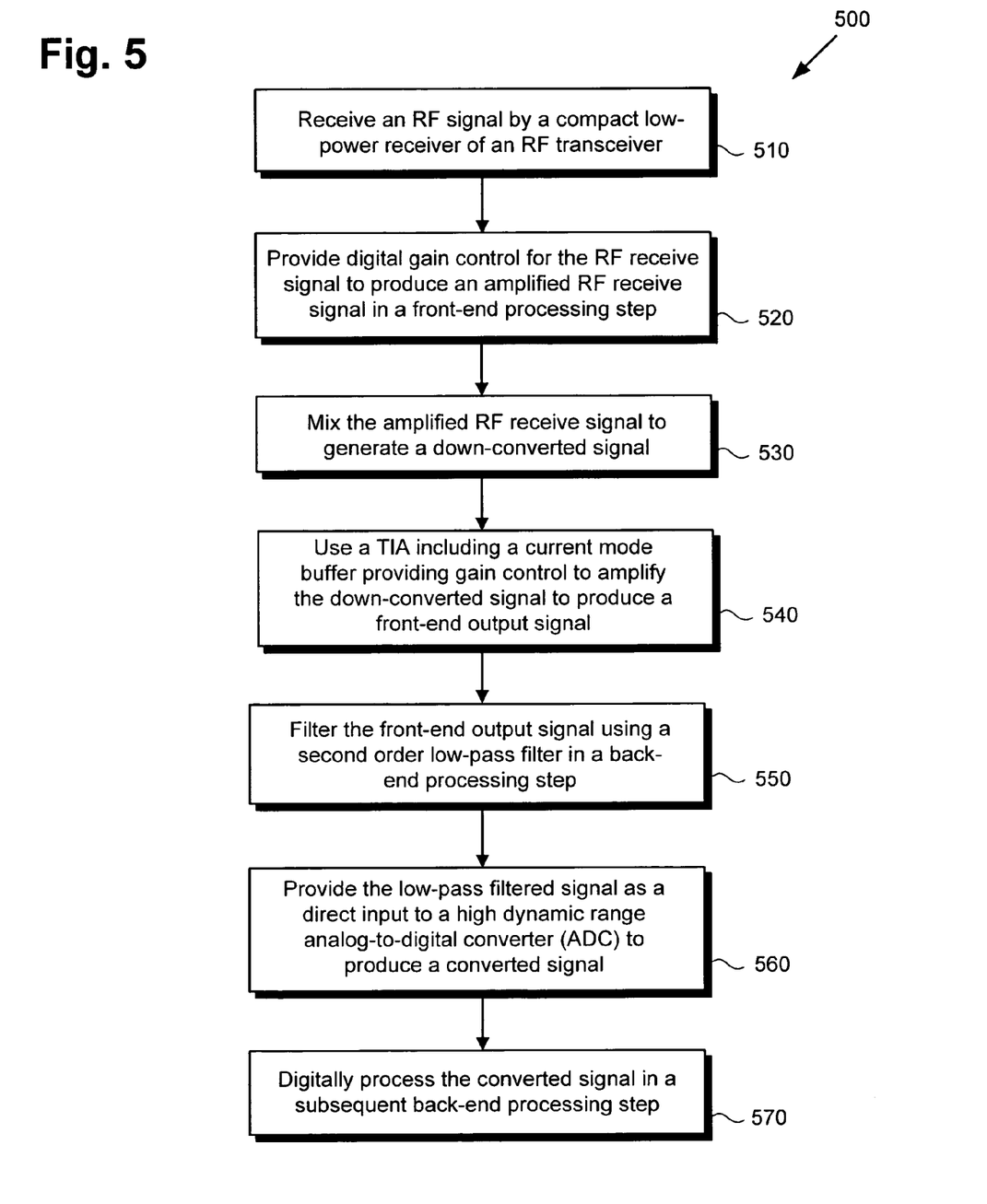
FIG. 5 is a flowchart presenting a method for use by a compact low-power receiver to process a receive signal, according to one embodiment of the present invention.

The operation of compact low-power receiver 210 will now be further described by reference to FIGS. 3, 4, and 5. FIG. 3 shows a conceptual block diagram depicting a conventional operational amplifier (op-amp) based TIA implementation, while FIG. 4 shows a TIA providing gain control through implementation of a current mode buffer, according to one embodiment of the present invention. FIG. 5 is a flowchart presenting an example method for use by a compact low-power receiver to process a receive signal.

Referring to FIG. 3, FIG. 3 shows conventional op-amp based TIA 326, corresponding to TIAs 126a and 126b, in FIG. 1. As shown in FIG. 3, in addition to op-amp 325, conventional op-amp based TIA 326 comprises RC networks 327a and 327b providing feedback for conventional op-amp TIA 326. As further shown in FIG. 3, RC network 327a comprises feedback resistor 328a and feedback capacitor 329a arranged in parallel. Similarly, RC network 327b comprises a matching parallel pairing of feedback resistor 328b and feedback capacitor 329b. Conventional op-amp based TIA 326 receives input current from current source 303, corresponding to either of the I and Q current signals shown in FIG. 1, and provides a voltage signal $V_{OUT}$ corresponding to an output signal of receiver front-end 120, in FIG. 1. As known in the art, the values of feedback resistors 328a and 328b and feedback capacitors 329a and 329b determine the pole frequency of conventional op-amp based TIA 326, while the value of resistors 328a and 328b determines the gain provided by conventional op-am based TIA 326. It is noted that the representation of FIG. 3 requires two resistors, each having resistance R, and two capacitors, each having a capacitance of 2C. Thus, circuit area sufficient to provide 4C of capacitance is required for implementation of the feedback necessary to support the particular level of gain and the pole frequency represented by the implementation of conventional op-amp based TIA 326 shown in FIG. 3.

Moving to FIG. 4, FIG. 4 shows TIA 426 including current mode buffer 425, to according to one embodiment of the present invention, corresponding to TIAs 226a and 226b including respective current mode buffers 225a and 225b, in FIG. 2. As shown in FIG. 4, in addition to current mode buffer 425, TIA 426 comprises RC network 427. As further shown in FIG. 4, RC network 427 comprises output resistor 428 determining the gain provided by TIA 426, and output capacitor 429 arranged in parallel with output resistor 428. Together, output resistor 428 and output capacitor 429 determine the pole frequency of TIA 426. TIA 426 receives input current from current source 403, corresponding to either of the I and Q current signals shown in FIG. 2 after down conversion by respective mixers 224a and 224b, and provides a voltage signal $V_{OUT}$ corresponding to an output signal of receiver front-end 220, in FIG. 2, for example an output signal detectable at the dotted vertical line defining the border between receiver front-end 220 and receiver back-end 230.

Because the amount of gain provided by TIA 426 is determined by the value of output resistor 428, that gain may be scaled through appropriate selection of the resistance value. The respective representations of conventional op-amp based TIA 326, in FIG. 3, and the present implementation utilizing TIA 426 including current mode buffer 425, in FIG. 4, are depicted as providing comparable gain at substantially similar pole frequencies. Comparison of the two figures reveals that the conventional implementation of FIG. 3 requires four times more capacitance to perform comparably to TIA 426. Moreover, as output resistor 428 is increased from 2R to 4R, for example, output capacitor 429 need only be increased from C to 2C to provide increased gain at the desired pole frequency. By contrast, increasing the total feedback resistance in conventional op-amp based TIA 326 from 2R to 4R entails providing as much as an extra 4C of capacitance to maintain the same pole frequency, so that in absolute terms the cost of providing enhanced gain control for a desired pole frequency in the conventional design quickly becomes prohibitive.

In other words, because circuit area constraints may place a practical limit on how much of that valuable area can be dedicated to capacitor space, the conventional implementation shown in FIG. 3 renders any attempts to provide enhanced gain control at least costly, and perhaps entirely impracticable. By contrast, TIA 426 is implemented using a design that is both simpler, and substantially less consumptive of circuit space for substantially all combinations of pole frequency and gain.

Continuing now to FIG. 5, FIG. 5 presents flowchart 500 describing one embodiment of a method for use by a compact low-power receiver to process a receive signal. Certain details and features have been left out of flowchart 500 that are apparent to a person of ordinary skill in the art. For example, a step may comprise one or more substeps or may involve specialized equipment or materials, as known in the art. While steps 510 through 570 indicated in flowchart 500 are sufficient to describe one embodiment of the present invention, other embodiments of the invention may utilize steps different from those shown in flowchart 500, or may comprise more, or fewer, steps.

Step 510 of flowchart 500 comprises receiving an RF signal by a compact low-power receiver of an RF transceiver. Referring to FIG. 2, step 510 may be seen to correspond to compact low-power receiver 210 of transceiver 200 receiving an RF signal through antenna 202 and T/R switch 205 via transceiver input/output routing switch 203b in a second-generation wireless telephone technology (2G) mode, for example. Alternatively, step 510 can correspond to compact low-power receiver 210 receiving an RF signal through antenna 202 and duplexer 204 via transceiver input/output routing switch 203a in a 3G mode, for example. In it's various embodiments, transceiver 200 including compact low-power receive 210 can be implemented in, for example, a wireless communications device, a cellular telephone, a Bluetooth enabled device, a computer, a satellite set-top box, an RF transceiver, a personal digital assistant (PDA), or in any other kind of system, device, component or module utilized as a transceiver in modern electronics applications.

Continuing with step 520 in FIG. 5, step 520 of flowchart 500 comprises providing digital gain control for the RF receive signal to produce an amplified RF receive signal. Referring once again to FIG. 2, step 520 can be part of a front-end processing step resulting in production of a front-end gain. For example, step 520 may be performed in receiver front-end 220 by LNA 222, which includes adjustable transconductance amplifier 223 configured provide digital gain control to the RF receive signal and to thereby produce an amplified RF receive signal at the output of LNA 222.

Moving to step 530 of FIG. 5 and continuing to refer to compact low-power receiver 210, in FIG. 2, step 530 of flowchart 500 comprises mixing the amplified receive signal to generate a down-converted signal. According to the embodiment of FIG. 2, step 530 is performed by mixers 224a and 224b, and results in generation of down-converted I and Q signals, which are directed to respective TIAs 226a and 226b. For example, the amplified receive signal provided as an output of LNA 222 can be down-converted by mixers 224a and 224b to generate baseband I and Q signals.

Continuing with step 540 of flowchart 500, step 540 comprises using TIAs 226a and 226b including respective adjustable current mode buffers 225a and 225b to amplify the down-converted respective I and Q signals. As may be seen by reference to FIG. 2, steps 520, 530, and 540 may all be characterized as front-end processing steps, resulting in the amplified down-converted signals produced by TIAs 226a and 226b being provided as front-end output signals from receiver front-end 220. Step 540 may be performed by TIA 426, in FIG. 4, for example, which has previously been described as being capable of providing scalable gain control. Collectively, the front-end processing steps 520, 530, and 540 are capable of producing a front-end gain of approximately 50 dB, or more, for example.

Moving on to step 550 of flowchart 500 and referring once again to FIG. 2, step 550 comprises filtering the front-end output signals using $2^{nd}$-order LPFs 232a and 232b in a back-end processing step. As shown in FIG. 2, $2^{nd}$-order LPFs 232a and 232b comprise part of receiver back-end 230. Moreover, as previously explained, because the front-end gain produced by receiver front-end 220 is boosted relative to conventional designs, the back-end gain produced by receiver back-end 230 may be correspondingly reduced. As further shown in FIG. 2, in contrast to conventional implementations requiring relatively high back-end gain, compact low-power receiver 210 implements $2^{nd}$-order LPFs 232a and 232b providing approximately 15 dB of gain, which additionally enables elimination of the DC offset cancellation circuitry at the ADC inputs required in the conventional art. Consequently, embodiments of the present invention result in the front-end gain produced by receiver front-end 220 being substantially greater, such as twice as great, or more, than the back-end gain produced by receiver back-end 230.

Referring now to step 560 of FIG. 5, step 560 of flowchart 500 comprises providing the $2^{nd}$-order LPF filtered signal directly to ADCs 240a and 240b to produce a converted signal. As described above, one of the many advantages accruing from the present novel and inventive compact low-power receiver architecture is that the filtered output of $2^{nd}$-order LPF stage 232 can be fed directly to ADC stage 240, without first performing DC offset cancellation, thereby eliminating the additional circuit complexity, power consumption, and area requirements burdening conventional receiver designs. Moreover, due to the significant savings in circuit area and power consumption achieved through substitution of $2^{nd}$-order LPFs 232a and 232b for conventional high-order LPFs, and the elimination of DC offset cancellation circuitry mediating the interface of LPF stage 232 and ADC stage 240, ADCs 240a and 240b may implemented as high dynamic range ADCs without significantly affecting the compactness or low-power characteristics of receiver 210. Consequently, as shown in FIG. 2, ADC stage 240 can be implemented so as to provide approximately 70 dB of dynamic range, for example, compared to the approximately 60 dB provided by conventional ADC implementations and shown by conventional ADC stage 140, in FIG. 1.

Following analog-to-digital conversion in step 560, the converted signals produced by ADCs 240a and 240b undergo digital processing in step 570 of flowchart 500. Referring again to FIG. 2, step 570 may be performed by digital processors 250a and 250b in a subsequent back-end processing step, as known in the art.

Thus, by boosting front-end gain and reducing reliance on back-end gain, embodiments of the present invention provide a receiver that is both compact and consumes less power than conventional designs. Embodiments of the present invention implement $2^{nd}$-order LPFs in a compact low-power receiver back-end in place of the high-order LPFs required by conventional designs. Furthermore, that substitution can be made without sacrificing receiver performance. In addition, the use of $2^{nd}$-order LPFs in embodiments of the present invention enables omission of circuitry providing DC offset cancellation prior to analog-to-digital conversion of the filtered signal. That omission adds to the overall savings in both circuit area and power consumption achievable through implementation of the present inventive concepts, while also reducing circuit complexity compared to conventional designs.

From the above description of the invention it is manifest that various techniques can be used for implementing the concepts of the present invention without departing from its scope. Moreover, while the invention has been described with specific reference to certain embodiments, a person of ordinary skill in the art would recognize that changes can be made in form and detail without departing from the spirit and the scope of the invention. The described embodiments are to be considered in all respects as illustrative and not restrictive. It should also be understood that the invention is not limited to the particular embodiments described herein, but is capable of many rearrangements, modifications, and substitutions without departing from the scope of the invention.

The invention claimed is:

1. A compact low-power receiver comprising:
   a front-end producing a front-end gain, said front-end including:
   a transconductance amplifier providing digital gain control and outputting an amplified receive signal;
   a mixer for generating a down-converted signal from said amplified receive signal;
   a transimpedance amplifier (TIA) including a current mode buffer, said TIA providing gain control for amplifying said down-converted signal to produce a front-end output signal;
   a back-end producing a back-end gain;
   wherein said front-end gain is substantially greater than said back-end gain.

2. The compact low-power receiver of claim 1, wherein said front-end gain is at least twice as great as said back-end gain.

3. The compact low-power receiver of claim 1, wherein said back-end is configured to filter said front-end output signal using a second-order low-pass filter to produce a filtered signal.

4. The compact low-power receiver of claim 3, wherein said filtered signal is fed directly to an analog-to-digital converter (ADC) of said back-end without DC offset cancellation.

5. The compact low-power receiver of claim 1, wherein said back-end comprises a high dynamic range ADC having a dynamic range of greater than approximately 60 dB.

6. The compact low-power receiver of claim 1, wherein said front-end gain is approximately 50 dB or greater, and said back-end gain is less than approximately 25 dB.

7. The compact low-power receiver of claim 1, wherein said compact low-power receiver is implemented in combination with a transmitter as part of a radio frequency (RF) transceiver.

8. A radio frequency (RF) transceiver comprising:
   a transmitter in combination with a compact low-power receiver;
   said compact low-power receiver having a front-end producing a front-end gain and a back-end producing a back-end gain, said front-end including:
   a transconductance amplifier providing digital gain control and outputting an amplified receive signal;
   a mixer for generating a down-converted signal from said amplified receive signal;
   a transimpedance amplifier (TIA) including a current mode buffer, said TIA providing gain control for amplifying said down-converted signal to produce a front-end output signal;
   wherein said front-end gain is substantially greater than said back-end gain.

9. The RF transceiver of claim 8, wherein said front-end gain is at least twice as great as said back-end gain.

10. The RF transceiver of claim 8, wherein said back-end is configured to filter said front-end output signal using a second-order low-pass filter to produce a filtered signal.

11. The RF transceiver of claim 10, wherein said filtered signal is fed directly to an analog-to-digital converter (ADC) of said back-end without DC offset cancellation.

12. The RF transceiver of claim 8, wherein said back-end comprises a high dynamic range ADC having a dynamic range of greater than approximately 60 dB.

13. The RF transceiver of claim 8, wherein said front-end gain is approximately 50 dB or greater, and said back-end gain is less than approximately 25 dB.

14. A method for use by a receiver to process a receive signal, said method comprising:
   performing a front-end processing of said receive signal to produce a front-end gain, said front-end processing including:
   utilizing a transconductance amplifier providing digital gain control for said receive signal to produce an amplified receive signal;
   mixing said amplified receive signal to generate a down-converted signal;

using a transimpedance amplifier including a current mode buffer providing gain control for amplifying said down-converted signal to produce a front-end output signal;
performing a back-end processing of said front-end output signal, to produce a back-end gain;
wherein said front-end gain is substantially greater than said back-end gain.

15. The method of claim 14, wherein said front-end gain is at least twice as great as said back-end gain.

16. The method of claim 14, wherein performing said back-end processing comprises filtering said front-end output signal using a second-order low-pass filter to produce a filtered signal.

17. The method of claim 16, wherein performing said back-end processing comprises feeding said filtered signal directly to an analog-to-digital converter (ADC) of said back-end without DC offset cancellation.

18. The method of claim 14, wherein performing said back-end processing comprises utilizing a high dynamic range ADC having a dynamic range of greater than approximately 60 dB.

19. The method of claim 14, wherein said front-end gain is approximately 50 dB or greater, and said back-end gain is less than approximately 25 dB.

20. The method of claim 14, wherein said receiver is a compact low-power receiver implemented in combination with a transmitter as part of a radio frequency (RF) transceiver.

* * * * *